US012768290B2

(12) United States Patent
Hata et al.

(10) Patent No.: US 12,768,290 B2
(45) Date of Patent: Oct. 20, 2026

(54) STEAM VALVE AND POWER GENERATION SYSTEM

(71) Applicant: MITSUBISHI HEAVY INDUSTRIES, LTD., Tokyo (JP)

(72) Inventors: Masaki Hata, Tokyo (JP); Tamiaki Nakazawa, Tokyo (JP); Fumiyuki Suzuki, Tokyo (JP); Kazuo Hirota, Tokyo (JP); Shingo Nishida, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 19/099,127

(22) PCT Filed: Jul. 24, 2023

(86) PCT No.: PCT/JP2023/026920
§ 371 (c)(1),
(2) Date: Jan. 28, 2025

(87) PCT Pub. No.: WO2024/034368
PCT Pub. Date: Feb. 15, 2024

(65) Prior Publication Data

US 2026/0043339 A1 Feb. 12, 2026

(30) Foreign Application Priority Data

Aug. 12, 2022 (JP) ................................. 2022-128695

(51) Int. Cl.
*F01K 11/02* (2006.01)
*F01K 27/00* (2006.01)
*F16K 25/04* (2006.01)

(52) U.S. Cl.
CPC .............. *F01K 11/02* (2013.01); *F01K 27/00* (2013.01); *F16K 25/04* (2013.01)

(58) Field of Classification Search
CPC .. Y10T 137/86976; F01K 11/02; F01K 27/00; F16K 25/04; F16K 1/443; F16K 39/024; F01D 17/145
See application file for complete search history.

(56) References Cited

U.S. PATENT DOCUMENTS 98,688 A * 1/1870 Gould .................. F16K 39/024 137/630.14
3,141,476 A * 7/1964 Davis .................... F01D 17/145 251/86

(Continued)

FOREIGN PATENT DOCUMENTS

JP S54-134921 U 9/1979
JP S62-267504 A 11/1987

(Continued)

OTHER PUBLICATIONS

Translation of JP2020106120 retrieved from espacenet.com. (Year: 2026).*

(Continued)

*Primary Examiner* — Jessica Cahill
(74) *Attorney, Agent, or Firm* — WHDA, LLP

(57) ABSTRACT

A steam valve with a valve body that includes a flow path partition part that partitions a steam flow path through which steam flows; and a valve seat provided halfway through the steam flow path and having an opening part. The steam valve is provided with a stop valve, which includes a valve rod extending in an axial direction in which an axial line extends, and capable of advancing and retracting in the axial direction. The stop valve includes a child valve fixed to the tip-end of the valve rod in a tip-end part of the valve rod. The stop valve includes a parent valve that includes a penetration part into which a portion of the tip-end part of the valve rod positioned closer to the base end side of the valve rod than (Continued)

to the tip-end is inserted, closes the steam flow path when abutted on the valve seat.

14 Claims, 7 Drawing Sheets

(56) References Cited

U.S. PATENT DOCUMENTS

| | | | | |
|---|---|---|---|---|
| 4,114,651 | A * | 9/1978 | Oberle | F01D 17/145 137/613 |
| 4,986,309 | A * | 1/1991 | Bellanca | F01D 17/145 137/630.14 |
| 11,384,863 | B2 * | 7/2022 | Hasegawa | F16K 37/005 |
| 2006/0005889 | A1 * | 1/2006 | Takahashi | F16K 1/36 137/625.39 |
| 2014/0000258 | A1 * | 1/2014 | Nishimoto | F01K 21/00 60/643 |
| 2015/0322812 | A1 * | 11/2015 | Futahashi | F01D 17/10 60/660 |
| 2018/0334919 | A1 * | 11/2018 | Lee | F01D 17/145 |
| 2022/0082169 | A1 * | 3/2022 | Nishida | F01D 25/04 |

FOREIGN PATENT DOCUMENTS

| | | | | |
|---|---|---|---|---|
| JP | 2006-46331 | A | | 2/2006 |
| JP | 2014-70513 | A | | 4/2014 |
| JP | 2019100228 | A | * | 6/2019 |
| JP | 2020-106120 | A | | 7/2020 |

OTHER PUBLICATIONS

Notification of Transmittal of Translation of the International Preliminary Report on Patentability (Form PCT/IB/338) issued in counterpart International Application No. PCT/JP2023/026920 mailed Feb. 27, 2025 with Forms PCT/IB/373, PCT/ISA/237 and PCT/IB/326, with English Translation. (13 pages).

International Search Report dated Sep. 5, 2023, issued in counterpart Application No. PCT/JP2023/026920 (10 pages).

* cited by examiner

STEAM VALVE AND POWER GENERATION SYSTEM

TECHNICAL FIELD

The present disclosure relates to a steam valve and a power generation system.

The present application claims priority based on Japanese Patent Application No. 2022-128695 filed in Japan on Aug. 12, 2022, the contents of which are incorporated herein by reference.

BACKGROUND ART

For example, in a power generation system using a steam turbine, a steam amount to be supplied for driving the steam turbine is adjusted in response to a change in load, or a steam valve for stopping the supply of steam to the steam turbine in a case where an abnormality occurs is used. Typically, the steam valve is configured to include a valve seat having an opening portion, a valve rod that moves a valve body provided to face the opening portion of the valve seat in a direction of contacting and separating the valve body with respect to the valve seat, and a cylindrical support member that slidably supports the valve rod. In the steam valve having such a configuration, it is important to suppress the abrasion of the valve body due to the rotation or the rattling of the valve body caused by the steam.

PTL 1 is a structural example of this type of steam valve. PTL 1 discloses a steam valve (main steam stop valve) for a steam turbine in which a plane of a valve body (a surface parallel to an axial direction of a valve rod) and a plane of the valve rod (a surface parallel to the axial direction of the valve rod) are brought into surface contact with each other in a fitting portion between the valve body and the valve rod.

CITATION LIST

Patent Literature

[PTL 1] Japanese Unexamined Patent Application Publication No. 2014-70513

SUMMARY OF INVENTION

Technical Problem

Some steam valves have a stop valve including a valve rod, a sub valve disposed at a tip end of the valve rod, and a main valve having a through-hole through which steam flows in a case where the sub valve is opened (a configuration corresponding to the valve body disclosed in PTL 1). In such a steam valve, since the sub valve connected to an actuator is opened before the main valve, the through-hole provided in the main valve is opened to reduce the differential pressure between the upstream and downstream of the main valve, and the opening operation of the main valve is facilitated.

In the steam valve having the above configuration, from the viewpoint of suppressing the abrasion of the stop valve, it is important to support the main valve so that the main valve does not rotate or swing with respect to the valve rod in a state where the sub valve and the main valve are opened. However, in the valve structure disclosed in PTL 1, the fitting portion between the valve rod and the valve body is configured such that the planes of the valve rod and the valve body are fitted to be in contact with each other, and the distance of the valve rod in the axial direction on the plane is relatively short. Therefore, it is difficult to support the main valve so as not to swing and be inclined with respect to the axial direction in a state where the main valve is opened. Therefore, in a state where the main valve is opened, the main valve may swing with respect to the valve rod, and thus abrasion may occur in the stop valve.

An object of at least one embodiment of the present disclosure is to provide a steam valve and a power generation system capable of suppressing abrasion of a stop valve in a state where the stop valve is opened, in view of the above-described circumstances.

Solution to Problem (1) A steam valve according to at least one embodiment of the present disclosure includes:

- a valve body that has a flow path partition portion that partitions a steam flow path through which steam flows, and a valve seat that is provided in a middle of the steam flow path and has an opening portion; and
- a stop valve, and
- the stop valve includes
  - a valve rod that extends in an axial direction along which an axis extends and is configured to advance and retract in the axial direction,
  - a sub valve that is fixed to a tip end of the valve rod of a tip end portion of the valve rod,
  - a main valve that includes a penetrating portion into which a portion of the tip end portion of the valve rod positioned on a base end side of the valve rod with respect to the tip end is inserted, that closes the steam flow path by abutting the valve seat, and in which a through-hole through which steam flows in a case where the sub valve is opened is formed, and
  - a guide portion that is movable in the axial direction together with the main valve and guides a side surface of the sub valve to be slidable along the axial direction.

(2) A power generation system according to at least one embodiment of the present disclosure includes:

- the steam valve having the configuration of the above (1);
- a boiler that generates steam;
- a steam turbine that is driven by the steam; and
- a steam supply pipe that connects the boiler and the steam turbine to each other and supplies the steam to the steam turbine, and
- the steam valve is provided in the steam supply pipe.

Advantageous Effects of Invention

According to at least one embodiment of the present disclosure, it is possible to suppress the abrasion of the stop valve in a state where the stop valve is opened.

DESCRIPTION OF EMBODIMENTS

Figure 1:
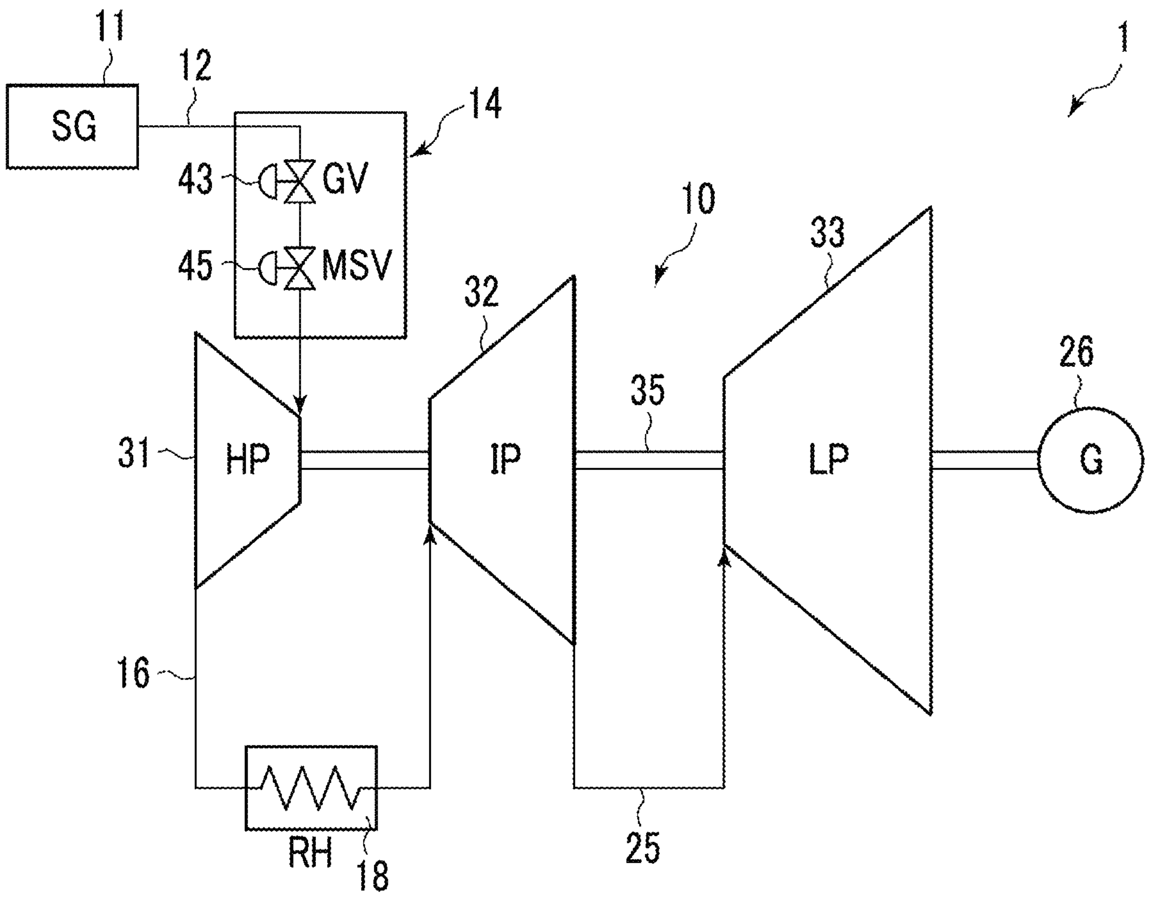
FIG. 1 is a schematic configuration diagram of a power generation system according to an embodiment.

Hereinafter, some embodiments of the present disclosure will be described with reference to the accompanying drawings. However, sizes, materials, shapes, and relative dispositions of components described as the embodiments or illustrated in the drawings are not intended to limit the scope of the present disclosure, and are merely examples for describing the present disclosure.

For example, expressions representing relative or absolute dispositions such as "in a certain direction", "along a certain direction", "parallel", "orthogonal", "center". "concentric", or "coaxial" not only strictly represent the dispositions, but also represent a state in which the dispositions are relatively displaced with a tolerance or at an angle or a distance to such an extent that the same function can be obtained.

For example, expressions representing that things are in an equal state such as "same", "equal", and "homogeneous" not only strictly represent an equal state, but also represent a state in which a difference exists with a tolerance or to such an extent that the same function can be obtained.

For example, expressions representing shapes such as a quadrangular shape and a cylindrical shape not only represent shapes such as a quadrangular shape and a cylindrical shape in a geometrically strict sense, but also represent shapes including an uneven portion or a chamfered portion within a range where the same effect can be obtained.

In addition, expressions of "being provided with", "being equipped with", "including", or "having" one component are not exclusive expressions excluding the presence of other components.

Overall Configuration of Power Generation System

First, a power generation system 1 to which a steam valve 14 according to at least one embodiment of the present disclosure is applied will be described. FIG. 1 is a schematic configuration diagram of a power generation system 1 according to an embodiment. The power generation system 1 includes a steam turbine 10, a boiler 11, and a generator 26.

The steam turbine 10 is a turbine that is driven by steam generated in the boiler 11. The steam turbine 10 is connected to the boiler 11 through a first steam supply pipe 12, and is driven by supply of high-pressure steam generated by combusting fuel in the boiler 11. A steam valve 14 for adjusting a flow rate of steam supplied to the steam turbine 10 is provided in the first steam supply pipe 12. The configuration of the steam valve 14 includes a throttle valve 43 and a stop valve 45, which will be described later.

In the present embodiment, a multi-stage turbine is exemplified as the steam turbine 10, and the steam turbine 10 includes a high-pressure steam turbine 31, a medium-pressure steam turbine 32, and a low-pressure steam turbine 33 from the upstream side with respect to the flow path of the steam. The high-pressure steam turbine 31 is driven by the steam (high-pressure steam generated by the boiler 11) supplied from the first steam supply pipe 12. The steam that has finished the work in the high-pressure steam turbine 31 is supplied to the medium-pressure steam turbine 32 through the second steam supply pipe 16. A reheater 18 is provided in the second steam supply pipe 16.

The medium-pressure steam turbine 32 is driven by the steam (the steam that has finished the work in the high-pressure steam turbine 31) supplied from the second steam supply pipe 16. The steam that has finished the work in the medium-pressure steam turbine 32 is supplied to the low-pressure steam turbine 33 through the third steam supply pipe 25. The low-pressure steam turbine 33 is driven by the steam (the steam that has finished the work in the medium-pressure steam turbine 32) supplied from the third steam supply pipe 25.

Each turbine (the high-pressure steam turbine 31, the medium-pressure steam turbine 32, and the low-pressure steam turbine 33) constituting the steam turbine 10 has a common rotary shaft 35. The generator 26 is connected to the rotary shaft 35, and the generator 26 is driven by the rotation of each turbine to perform power generation.

Configuration of Steam Valve 14

Next, the configuration of the steam valve 14 according to some embodiments will be described with reference to the drawings.

Figure 2:
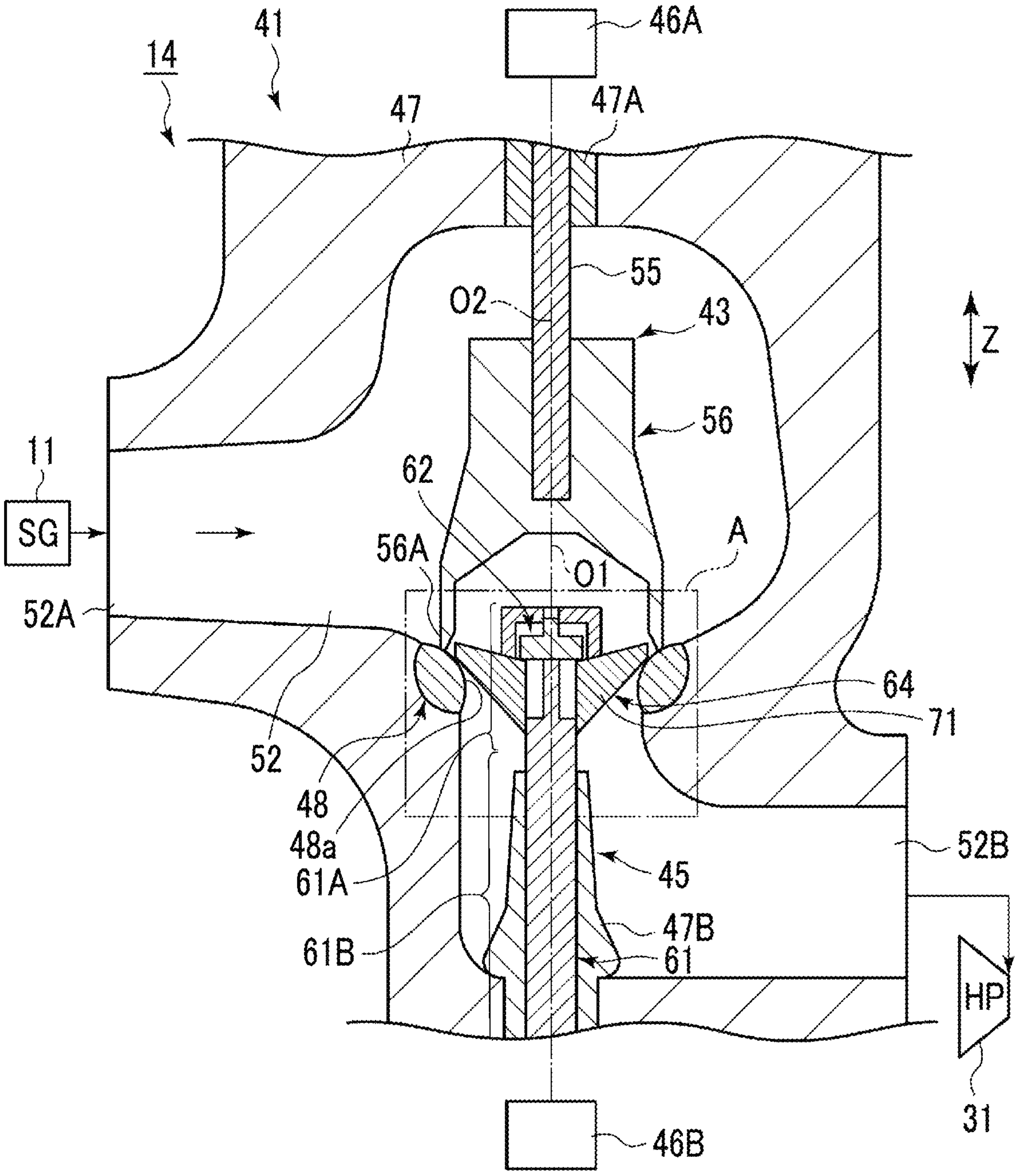
FIG. 2 is a cross-sectional view showing a configuration of a steam valve according to the embodiment in a state where a main valve and a sub valve are in a closed state.

FIG. 2 is a cross-sectional view showing a configuration of the steam valve 14 according to the embodiment in a state where the main valve 64 and the sub valve 62 are in a closed state.

Figure 3A:
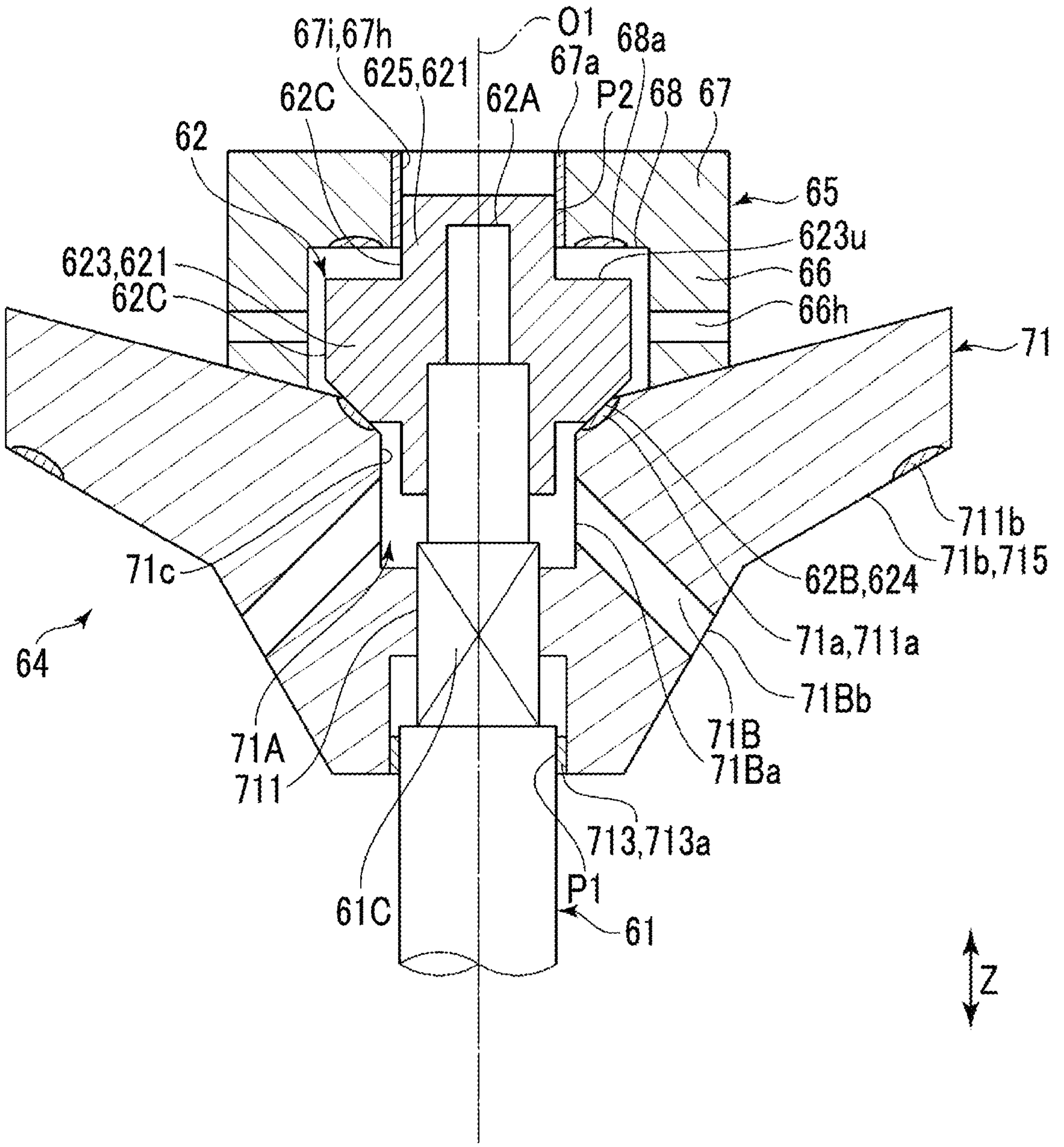
FIG. 3A is an enlarged view of the region A of FIG. 2.

FIG. 3A is an enlarged view of the region A of FIG. 2.

Figure 3B:
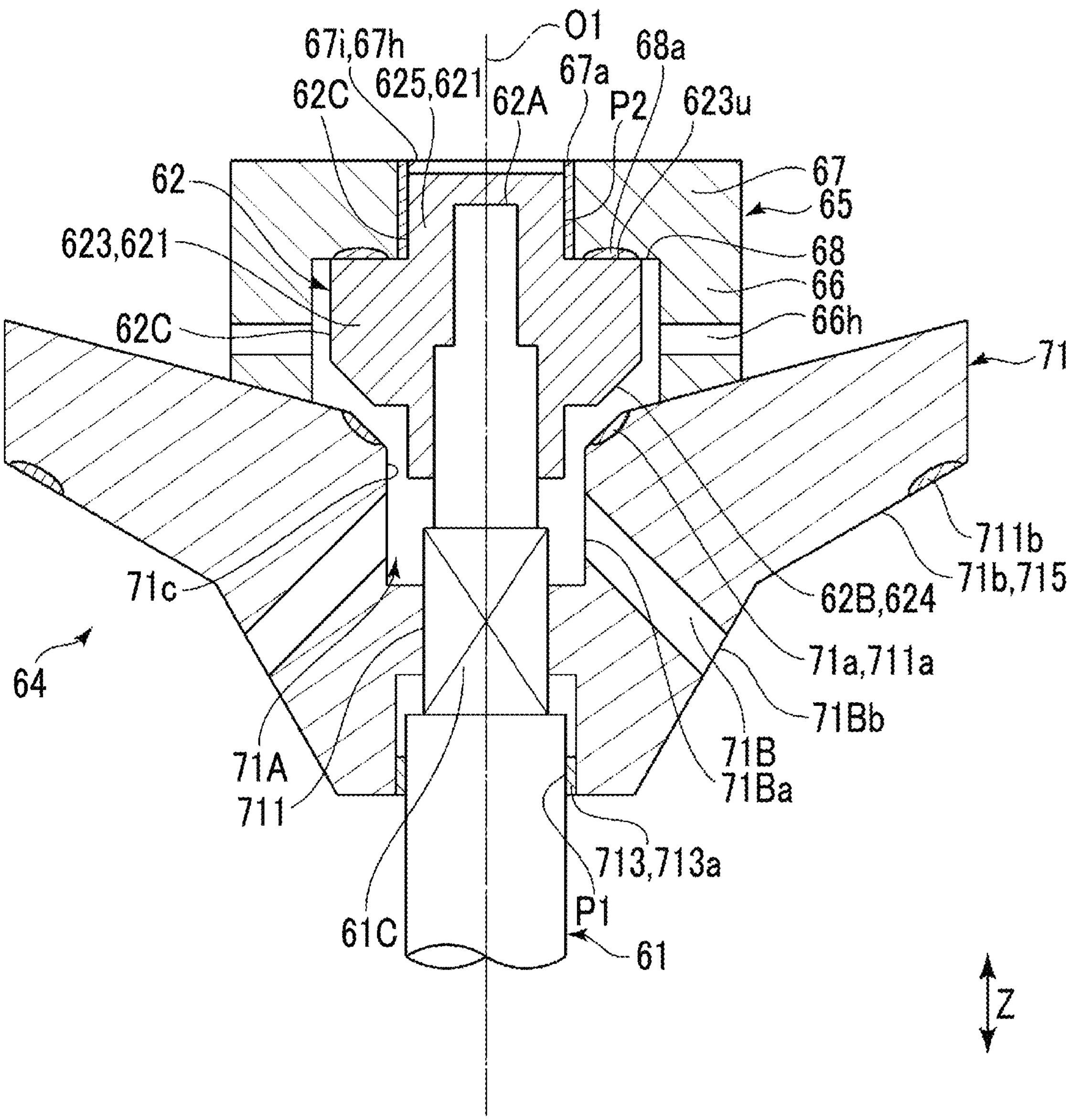
FIG. 3B is a schematic view showing a state in which the sub valve is opened first while the main valve remains in the closed state, in the steam valve according to the embodiment shown in FIG. 3A.

FIG. 3B is a schematic view schematic view showing a state in which the sub valve 62 is opened first while the main valve 64 remains in the closed state, in the steam valve 14 according to the embodiment shown in FIG. 3A.

Figure 4A:
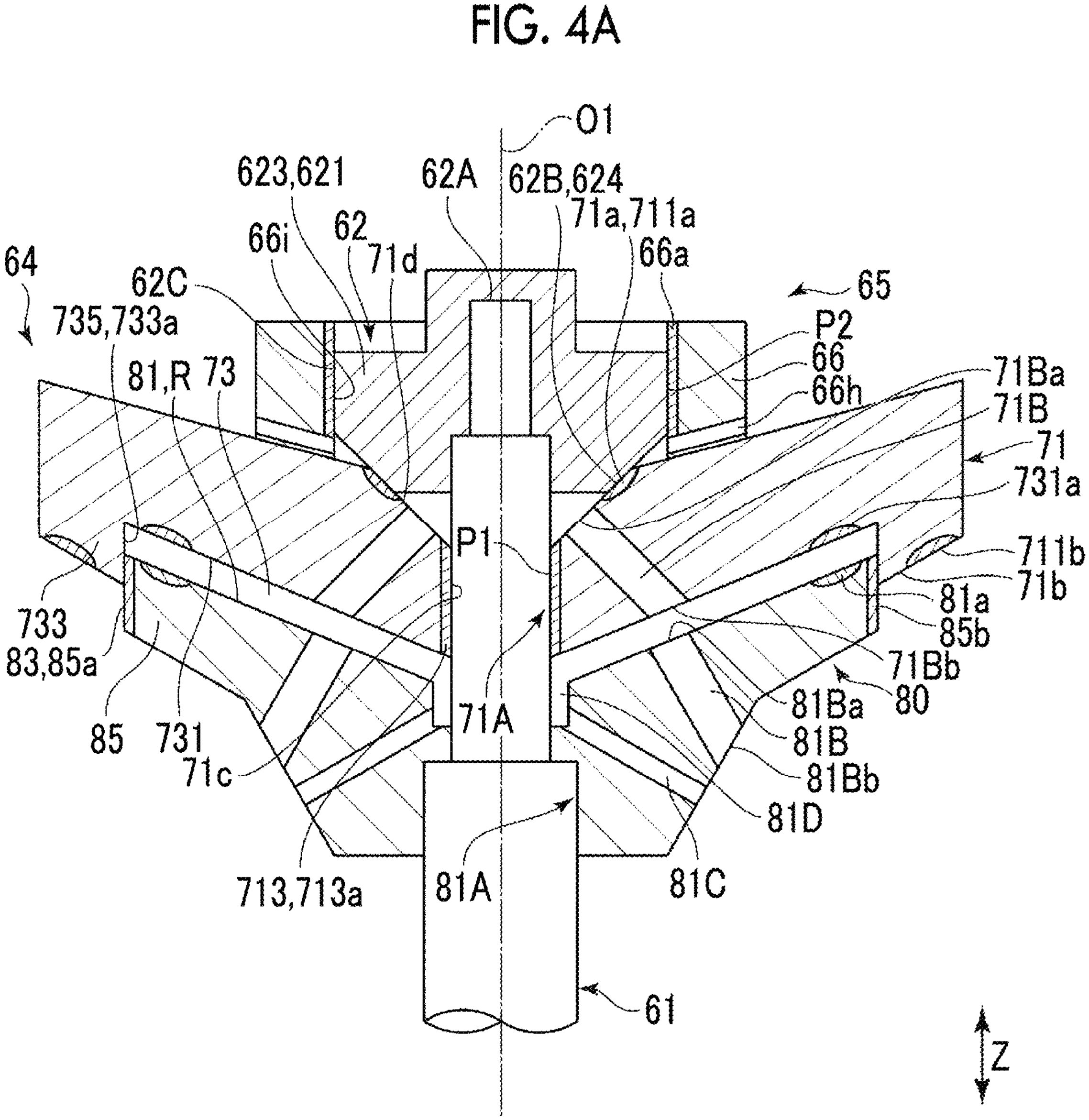
FIG. 4A is a schematic view corresponding to an enlarged view of the region A in FIG. 2 for the steam valve according to another embodiment.

FIG. 4A is a schematic view corresponding to an enlarged view of the region A in FIG. 2 for the steam valve 14 according to another embodiment.

Figure 4B:
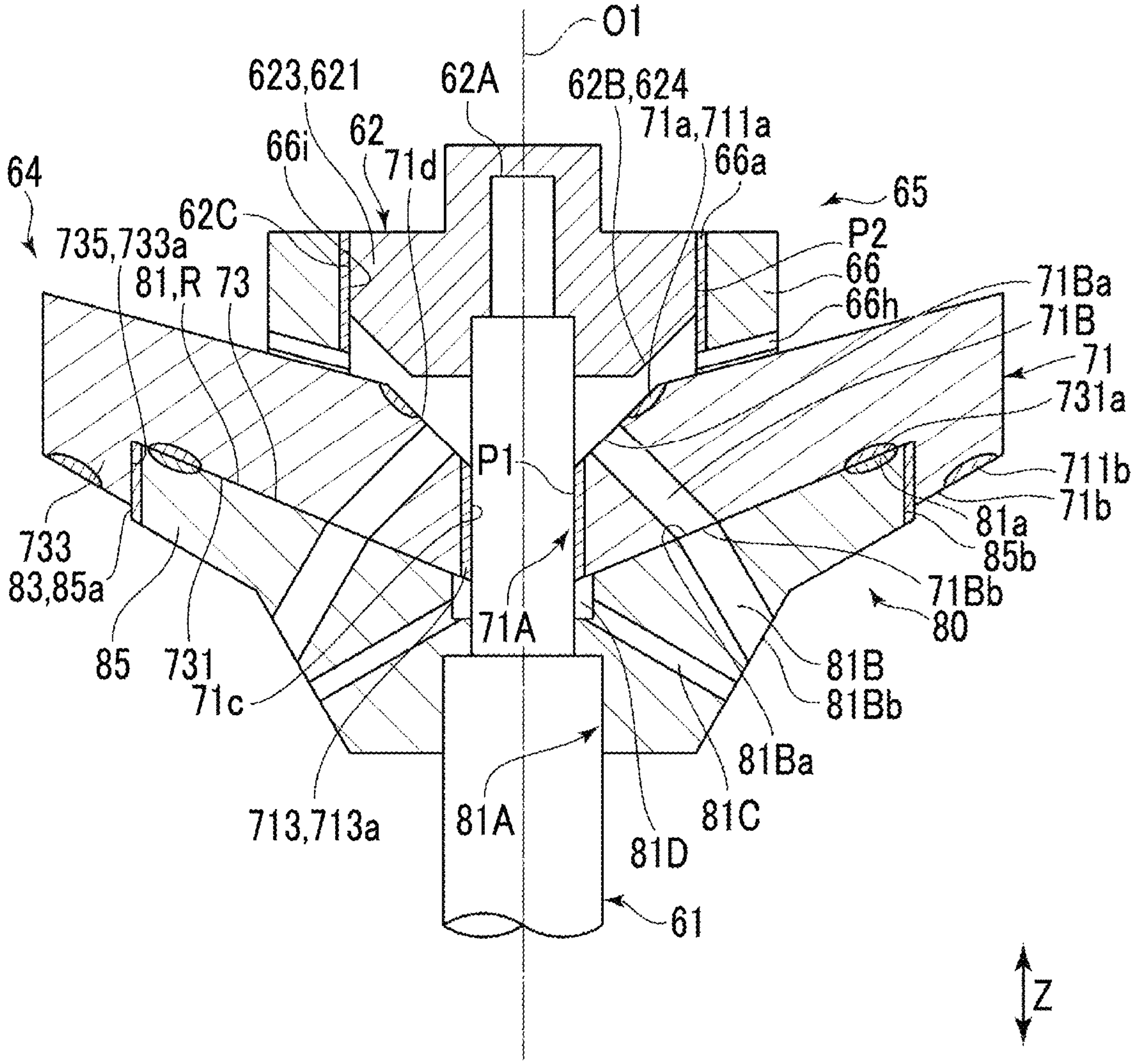
FIG. 4B is a schematic view showing a state in which the sub valve is opened first while the main valve remains in the closed state, in the steam valve according to another embodiment shown in FIG. 4A.

FIG. 4B is a schematic view showing a state in which the sub valve 62 is opened first while the main valve 64 remains in the closed state, in the steam valve 14 according to another embodiment shown in FIG. 4A.

Figure 4C:
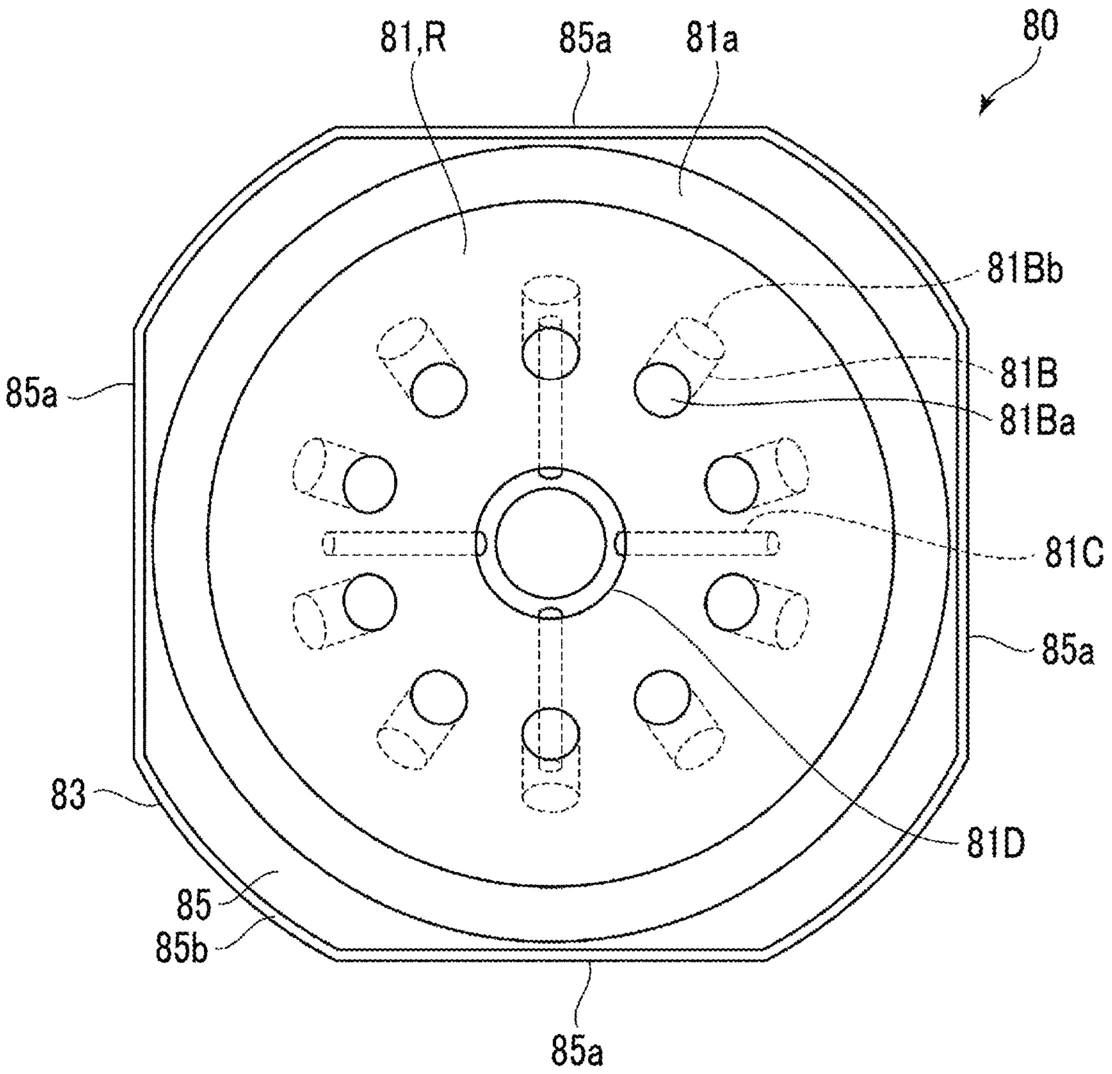
FIG. 4C is a schematic view of a support member in the steam valve according to another embodiment shown in FIG. 4A as seen from a tip end side in an axial direction.

FIG. 4C is a schematic view of a support member 80 in the steam valve 14 according to another embodiment shown in FIG. 4A as seen from a tip end side in an axial direction Z.

In FIGS. 2 and 3A to 4B, O1 is an axis of the valve rod 61 constituting the stop valve 45, and O2 is an axis of the valve rod 55 constituting the throttle valve 43. A direction in which the axes O1 and O2 extend (hereinafter, referred to as an "axial direction Z") is, for example, a substantially vertical direction. In FIGS. 2A to 4B, the upper side in the drawings is, for example, the upper side in a substantially vertical direction, and the lower side in the drawings is, for example, the lower side in the substantially vertical direction.

As shown in FIG. 2, the steam valve 14 includes a valve body 41, a throttle valve 43, a stop valve 45, and actuators 46A and 46B. The valve body 41 includes a flow path partition portion 47 and a valve seat 48. The flow path partition portion 47 partitions the steam flow path 52 and accommodates a part of the tip end side (lower side in FIG. 2) of the throttle valve 43 and a part of the tip end side (upper side in FIG. 2) of the stop valve 45. The steam flow path 52 includes an inlet portion 52A and an outlet portion 52B. The inlet portion 52A is connected to the boiler 11 through one side of the first steam supply pipe 12, and high-pressure steam generated in the boiler 11 is guided thereto. The outlet portion 52B is connected to the high-pressure steam turbine 31 through the other side of the first steam supply pipe 12.

The amount of steam supplied from the boiler 11 to the high-pressure steam turbine 31 through the first steam supply pipe 12 can be adjusted by controlling the opening degree of the throttle valve 43 in the steam valve 14 provided in the first steam supply pipe 12 in a state where the stop valve 45 is opened.

The flow path partition portion 47 includes a first guide member 47A and a second guide member 47B. The first guide member 47A is provided to cover an outer peripheral surface of a portion of the valve rod 55 constituting the throttle valve 43, which is not exposed to the steam flow path 52. The first guide member 47A functions as a guide that guides the valve rod 55 in the axial direction Z. The second guide member 47B is provided to cover an outer peripheral surface of the base end portion 61B of the valve rod 61 constituting the stop valve 45. The second guide member 47B functions as a guide that guides the valve rod 61 in the axial direction Z.

The valve seat 48 is provided in the flow path partition portion 47 that is positioned in the middle of the steam flow path 52. The valve seat 48 has a ring shape centered on the axis O1, and is configured such that the axis of the valve seat 48 coincides with the axis O1. The valve seat 48 has a valve seat surface 48*a* exposed to the steam flow path 52. The valve seat surface 48*a* is, for example, a curved surface. The valve seat surface 48*a* is configured to abut each of the main valve 64 that constitutes the stop valve 45 and the tip end 56A of a throttle valve body 56 that constitutes the throttle valve 43.

Throttle Valve 43

The throttle valve 43 is disposed on the upstream side of a position where the stop valve 45 is disposed in a flow direction of the steam. The throttle valve 43 includes a valve rod 55 and a throttle valve body 56. The valve rod 55 extends in the axial direction Z, and a tip end side thereof is disposed in the steam flow path 52. The axis O2 of the valve rod 55 is configured to match the axis O1 of the valve rod 61 of the stop valve 45. The valve rod 55 can be moved in the axial direction Z.

The throttle valve body 56 is provided on a tip end side (lower side in FIG. 2) of the valve rod 55. A portion of the throttle valve body 56 that is positioned on the valve seat 48 side (lower side in FIG. 2) has a tubular shape and has a tip end 56A that can abut against the valve seat surface 48*a* of the valve seat 48. The throttle valve 43 having such a configuration has a function of adjusting the flow rate of the high-pressure steam supplied to the high-pressure steam turbine 31 in accordance with the load of the steam turbine 10 by controlling the interval between the tip end 56A of the throttle valve body 56 and the valve seat 48 by moving the valve rod 55 along the axial direction Z by the actuator 46A.

Stop Valve 45

The stop valve 45 is disposed inside the throttle valve 43. The stop valve 45 is configured to include a valve rod 61, a sub valve 62, a main valve 64, and a guide portion 65.

The valve rod 61 extends in the axial direction Z and includes a tip end portion 61A and a base end portion 61B.

In the following description of the stop valve 45, an upper side in the drawing along the axial direction Z is referred to as a tip end side of the valve rod 61 or simply a tip end side, and a lower side in the drawing along the axial direction Z is referred to as a base end side of the valve rod 61 or simply a base end side.

The tip end portion 61A has a shape capable of fitting with the sub valve 62 for fixing the sub valve 62. The base end portion 61B extends along the axial direction Z and has a constant outer diameter size. The base end side of the base end portion 61B is connected to the actuator 46B. The valve rod 61 having the tip end portion 61A and the base end portion 61B is integrally formed and can advance and retract in the axial direction Z.

Sub Valve 62

As shown in FIGS. 3A to 4B, in the steam valve 14 according to some embodiments, the sub valve 62 includes a sub valve body 621 that constitutes the sub valve 62. The sub valve body 621 according to some embodiments includes a large-diameter portion 623 and a small-diameter portion 625 having a diameter smaller than that of the large-diameter portion 623 and positioned closer to the tip end side than the large-diameter portion 623.

The sub valve 62 according to some embodiments has a recessed portion 62A and an abutment portion 62B. The recessed portion 62A has a shape corresponding to the tip end portion 61A of the valve rod 61, and fits with the tip end portion 61A to fix the sub valve 62 to the tip end portion 61A of the valve rod 61. In the sub valve 62 according to some embodiments, the tip end portion 61A of the valve rod 61 is configured in a screw shape, and the recessed portion 62A is configured as a screw hole corresponding to the tip end portion 61A. The tip end portion 61A of the valve rod 61 is inserted into the recessed portion 62A of the sub valve 62, whereby the sub valve 62 is fixed to the valve rod 61.

As described above, since the recessed portion 62A formed in the sub valve 62 is fitted to the tip end portion 61A of the valve rod 61, the sub valve 62 is fixed to the valve rod 61. Therefore, the sub valve 62 is prevented from swinging or rotating with respect to the valve rod 61. Accordingly, the abrasion between the sub valve 62 and the valve rod 61 (the abrasion of the stop valve 45) can be suppressed.

The lower portion of the large-diameter portion 623 has a conical surface 624 formed such that a diameter thereof decreases toward the base end side. The conical surface 624 is provided with an abutment portion 62B. The abutment portion 62B is configured in a ring shape as viewed from the axial direction Z. In a state where the sub valve 62 is closed (a state shown in FIGS. 2, 3A, and 4A), the abutment portion 62B is positioned on the upper side of the through-hole 71B described below in the main valve body 71 constituting the main valve 64 and abuts the sub valve seat 71*a* provided on the main valve body 71. In this state, since the inlet 71Ba of the through-hole 71B is isolated from the steam flow path 52 through which the high-pressure steam flows, the high-pressure steam does not flow through the through-hole 71B.

In the steam valve 14 according to some embodiments, in a case where the flow rate of the steam is adjusted by the throttle valve 43, the stop valve 45 is opened before the throttle valve 43 is opened. At this time, in the stop valve 45, as shown in FIGS. 2, 3A, and 4A, the sub valve 62 is opened before the main valve 64 (the main valve 64 remains closed) from a state in which both the sub valve 62 and the main valve 64 are closed as shown in FIGS. 3B and 4B.

In this case, since the abutment portion 62B of the sub valve 62 is separated from the sub valve seat 71*a*, a gap is formed between the sub valve 62 and the main valve 64, and thus high-pressure steam flows into the inlet 71Ba of the through-hole 71B.

In the steam valve 14 according to the embodiment shown in FIG. 3B, the high-pressure steam that flows into the inlet 71Ba of the through-hole 71B is guided to the steam flow path 52 from the outlet 71Bb of the through-hole 71B.

In the steam valve 14 according to another embodiment shown in FIG. 4B, the high-pressure steam that flows into the inlet 71Ba of the through-hole 71B is guided to the steam flow path 52 from the outlet 71Bb of the through-hole 71B through the through-hole 81B of the support member 80 described below.

As a result, the differential pressure between the upstream and downstream sides of the main valve 64 is reduced, and the subsequent opening operation of the main valve 64 is facilitated.

Main Valve 64

The main valve 64 is disposed between the sub valve 62 and the base end portion 61B in a state where the main valve is inserted into the valve rod 61. The main valve 64 includes a main valve body 71. The main valve body 71 has a substantially V-shape when viewed from a vertical cross-sectional view. The main valve body 71 includes a penetrating portion 71A, a sub valve seat 71*a*, an abutting surface 71*b*, an inner peripheral surface 71*c*, and a plurality of through-holes 71B.

The penetrating portion 71A is formed to penetrate a central portion of the main valve body 71 in the axial direction Z. The penetrating portion 71A is a columnar hole and is partitioned by the inner peripheral surface 71*c*. The valve rod 61 is inserted into the penetrating portion 71A.

In the main valve 64 of the steam valve 14 according to some embodiments, the penetrating portion 71A is provided with a contact portion 713 that is in contact with the outer peripheral surface of the valve rod 61 on the base end side of the main valve 64 to be slidable.

In the main valve 64 of the steam valve 14 according to the embodiment shown in FIGS. 3A and 3B, the penetrating portion 71A is provided with a rectangular hole portion 711 that is configured to be slidably fitted to the rectangular cross-section portion 61C having a rectangular cross-section of the valve rod 61.

In the main valve 64 of the steam valve 14 according to some embodiments, the contact portion 713 includes a build-up portion 713*a*. For example, a Stellite (registered trademark) alloy is used for the build-up portion 713*a*. The material of the main valve 64 provided with the build-up portion 713*a* is, for example, high-chromium steel such as 9Cr steel, and the material of the valve rod 61 that is slidably in contact with the build-up portion 713*a* is, for example, a nickel-based superalloy such as Inconel (registered trademark).

In the main valve 64 of the steam valve 14 according to some embodiments, the valve seat surface of the sub valve seat 71*a* is a curved surface disposed on the sub valve 62 side (tip end side of the valve rod 61). The valve seat surface of the sub valve seat 71*a* abuts the abutment portion 62B of the sub valve 62 in a case where the sub valve 62 is closed (refer to FIGS. 2, 3A, and 4A).

In the main valve 64 of the steam valve 14 according to some embodiments, the sub valve seat 71*a* has a build-up portion 711*a*. For example, a Stellite (registered trademark) alloy is used for the build-up portion 711*a*.

In the main valve 64 of the steam valve 14 according to some embodiments, the abutting surface 71*b* is a curved surface disposed on the base end side of the valve rod 61. In a state where the main valve 64 is fully closed, an outer peripheral portion of the abutting surface 71*b* abuts against the valve seat surface 48*a* of the valve seat 48. In this state, the high-pressure steam does not flow to the downstream side of the valve seat 48. On the other hand, in a state where the main valve 64 is opened, the abutting surface 71*b* and the valve seat surface 48*a* are separated from each other, and a gap is formed between the abutting surface 71*b* and the valve seat surface 48*a*. Therefore, high-pressure steam corresponding to the opening degree of the throttle valve 43 flows to the downstream side of the valve seat 48.

In the main valve 64 of the steam valve 14 according to some embodiments, a build-up portion 711*b* is formed on a portion of an outer peripheral portion of the abutting surface 71*b*, which abuts the valve seat 48. For example, a Stellite (registered trademark) alloy is used for the build-up portion 711*b*.

The main valve body 71 of the steam valve 14 according to another embodiment shown in FIGS. 4A and 4B has a base end side recessed portion 73 recessed from the base end side toward the tip end side.

The base end side recessed portion 73 is partitioned by a bottom surface 731 facing the base end side and a peripheral wall portion 733 that surrounds an outer edge of the bottom surface 731 in a circumferential direction about the axis O1.

The bottom surface 731 is configured to abut an abutting surface 81 facing the tip end side in a support member 80 described below.

An inner peripheral surface 735 of the peripheral wall portion 733 is configured to be in contact with an outer peripheral surface 83 of a support member 80, which will be described later, to be slidable along the axial direction Z.

In the main valve body 71 of the steam valve 14 according to another embodiment shown in FIGS. 4A and 4B, the build-up portion 731*a* is formed in an annular region on the outer side in the radial direction with respect to the axis O1 of the bottom surface 731. The build-up portion 731*a* is built up with, for example, a nickel-based superalloy such as Inconel (registered trademark).

In the main valve 64 of the steam valve 14 according to the embodiment shown in FIGS. 3A and 3B, the plurality of through-holes 71B are formed to penetrate the main valve body 71 from the inner peripheral surface 71*c* facing the space surrounded by the guide portion 65, which will be described later, to the bottom surface 715 of the main valve body 71.

In the main valve 64 of the steam valve 14 according to another embodiment shown in FIGS. 4A and 4B, the plurality of through-holes 71B are formed to penetrate the main valve body 71 from the curved surface 71*d* facing the space surrounded by the guide portion 65, which will be described later, to the bottom surface 731.

In the main valve 64 of the steam valve 14 according to some embodiments, the plurality of through-holes 71B are disposed in the circumferential direction of the main valve body 71. Each through-hole 71B has an inlet 71Ba and an outlet 71Bb.

In the main valve 64 of the steam valve 14 according to the embodiment shown in FIGS. 3A and 3B, the inlet 71Ba is formed on the base end side of the abutting position between the abutment portion 62B and the sub valve seat 71*a*.

In the main valve 64 of the steam valve 14 according to another embodiment shown in FIGS. 4A and 4B, the inlet 71Ba is formed on the inner side in the radial direction from the abutting position between the abutment portion 62B and the sub valve seat 71*a*, in the curved surface 71*d* facing the space surrounded by the guide portion 65 described below.

As the sub valve 62 is opened before the main valve 64 as shown in FIG. 3B and FIG. 4B, and a gap is formed between the sub valve 62 and the main valve 64, high-pressure steam flows into the through-hole 71B through the inlet 71Ba.

In the main valve 64 of the steam valve 14 according to some embodiments, the outlet 71Bb is formed in the bottom surface 715 or the bottom surface 731 positioned on the outside in the radial direction of the position where the inlet 71Ba is formed with respect to the axis O1.

In the main valve 64 of the steam valve 14 according to the embodiment shown in FIGS. 3A and 3B, the outlet 71Bb communicates with the steam flow path 52 positioned on the downstream side of the valve seat 48.

In the main valve 64 of the steam valve 14 according to another embodiment shown in FIGS. 4A and 4B, the outlet 71Bb communicates with the steam flow path 52 positioned on the downstream side of the valve seat 48 through a through-hole 81B of a support member 80, which will be described later.

Guide Portion 65

In the main valve 64 of the steam valve 14 according to some embodiments, the guide portion 65 is configured to move in the axial direction Z together with the main valve 64 and to guide the side surface 62C of the sub valve 62 to be slidable along the axial direction Z.

In the main valve 64 of the steam valve 14 according to some embodiments, the guide portion 65 may be a separate member from the main valve body 71 and may be fixed to the main valve body 71 by a fastening member, such as a bolt (not shown), or may be formed integrally with the main valve body 71.

In the main valve 64 of the steam valve 14 according to some embodiments, the guide portion 65 has a tubular portion 66 that surrounds the side surface 62C of the sub valve 62 in the circumferential direction.

In the main valve 64 of the steam valve 14 according to another embodiment shown in FIGS. 3A and 3B, an annular plate portion 67 including a facing surface 68 facing toward the base end side and opposing the large-diameter portion 623 of the sub valve 62 is provided on the tip end side of the tubular portion 66.

In the main valve 64 of the steam valve 14 according to the embodiment shown in FIGS. 3A and 3B, a through-hole 67*h* penetrating the annular plate portion 67 in the axial direction Z is formed. The small-diameter portion 625 of the sub valve 62 is inserted into the through-hole 67*h*. The outer peripheral surface of the small-diameter portion 625 is guided to be slidable with respect to the inner peripheral surface 67*i* of the through-hole 67*h* along the axial direction Z.

In the guide portion 65 of the steam valve 14 according to the embodiment shown in FIGS. 3A and 3B, the build-up portions 67*a* and 68*a* are formed on the contact portion with the sub valve 62, that is, the inner peripheral surface 67*i* of the through-hole 67*h* and the facing surface 68. For example, a Stellite (registered trademark) alloy is used for the build-up portions 67*a* and 68*a*. The material of the guide portion 65 provided with the build-up portions 67*a* and 68*a* is, for example, a high-chromium steel such as 9Cr steel, and the material of the sub valve 62 that is slidably in contact with the build-up portion 67*a* and abuts the build-up portion 68*a* is, for example, a nickel-based superalloy such as Inconel (registered trademark) as described above.

In the main valve 64 of the steam valve 14 according to another embodiment shown in FIGS. 4A and 4B, the large-diameter portion 623 of the sub valve 62 is inserted into the tubular portion 66. The outer peripheral surface of the large-diameter portion 623 is guided along the axial direction Z to be slidable on the inner peripheral surface 66*i* of the tubular portion 66.

In a guide portion 65 of the steam valve 14 according to another embodiment shown in FIGS. 4A and 4B, a build-up portion 66*a* is formed on the contact portion with the sub valve, that is, an inner peripheral surface 66*i* of a tubular portion 66. For example, a Stellite (registered trademark) alloy is used for the build-up portion 66*a*. The material of the guide portion 65 provided with the build-up portion 67*a* is, for example, a high-chromium steel such as 9Cr steel as described above, and the material of the sub valve 62 that is slidably in contact with the build-up portion 66*a* is, for example, a nickel-based superalloy such as Inconel (registered trademark) as described above.

In the main valve 64 of the steam valve 14 according to some embodiments, the guide portion 65 is provided with a plurality of through-holes 66*h* formed such that steam flows in a case where the sub valve 62 is opened and steam in the inlet portion 52A of the steam flow path 52 is released to the outlet portion 52B of the steam flow path 52. In the main valve 64 of the steam valve 14 according to some embodiments, the plurality of through-holes 66*h* are formed, for example, in the tubular portion 66, to penetrate the tubular portion 66 in the radial direction.

Support Member 80

As shown in FIGS. 4A, 4B, and 4C, in the steam valve 14 according to another embodiment, the support member 80 is provided, which is positioned on the base end side with respect to the main valve 64, is fixed to the valve rod 61, and has an abutting surface 81 that is capable of abutting a bottom surface 731 facing the base end side of the main valve 64.

The support member 80 is configured to abut the abutting surface 81 with the bottom surface 731 of the main valve 64 in a case where the main valve 64 is opened, and support the main valve 64.

The support member 80 has a substantially V-shape in a vertical cross-sectional view. The support member 80 has an abutting surface 81, a penetrating portion 81A, a plurality of through-holes 81B, and a plurality of abrasion powder discharge holes 81C.

The penetrating portion 81A is formed to penetrate a central portion of the support member 80 in the axial direction Z. The valve rod 61 is inserted into the penetrating portion 81A.

The abutting surface 81 is a surface of the support member 80 facing toward the tip end side, and is an inclined surface inclined toward the base end side as going toward the inner side in the radial direction centered on the axis O1.

The plurality of through-holes 81B include an inlet 81B*a* and an outlet 81B*b*. The plurality of through-holes 81B are disposed in the circumferential direction of the support member 80 such that the inlet 81B*a* faces the outlet 71B*b* of the plurality of through-holes 71B of the main valve 64, and penetrate from the abutting surface 81 to the surface of the support member 80 on the base end side.

The plurality of abrasion powder discharge holes 81C are disposed in the circumferential direction of the support member 80, and penetrate from a recessed portion 81D recessed toward the base end side on the inner side in the radial direction of the abutting surface 81 to a surface of the support member 80 on the base end side.

A build-up portion 81*a* is formed in a region of the abutting surface 81 facing the build-up portion 731*a* provided on the bottom surface 731 of the main valve body 71. For example, a Stellite (registered trademark) alloy is used for the build-up portion 81*a*. In addition, the material of the support member 80 provided with the build-up portion 81*a* is, for example, high-chromium steel such as 9Cr steel.

An outer peripheral surface 83 of the support member 80 is configured to be in contact with an inner peripheral surface 735 of the peripheral wall portion 733 of the main valve body 71 to be slidable along the axial direction Z.

As shown in FIG. 4C, the outer peripheral portion 85 of the support member 80 has a linear outer peripheral portion 85*a* that is formed in a linear shape when viewed along the axis O1. In the example shown in FIG. 4C, the linear outer peripheral portion 85*a* extends in a tangent direction centered on the axis O1. In the example shown in FIG. 4C, the linear outer peripheral portion 85*a* is provided at four positions at 90 degrees with respect to the axis O1.

A contact portion of the support member 80 and the peripheral wall portion 733 of the main valve body 71, that is, an outer peripheral portion 85 of the support member 80 is provided with a build-up portion 85*b*. For example, a Stellite (registered trademark) alloy is used for the build-up portion 85*b*.

In the steam valve 14 according to another embodiment shown in FIGS. 4A, 4B, and 4C, the main valve 64 is formed in a linear shape when viewed along the axis O1 in the peripheral wall portion 733, and has a linear inner peripheral portion 733*a* facing the linear outer peripheral portion 85*a*.

Therefore, in the steam valve 14 according to another embodiment shown in FIGS. 4A, 4B, and 4C, since each of the linear inner peripheral portions 733*a* and each of the linear outer peripheral portions 85*a* face each other to be slidable with respect to each other, the main valve 64 is restricted from being rotationally moved in the circumferential direction centered on the axis O1 with respect to the support member 80 fixed to the valve rod 61. Therefore, in the steam valve 14 according to another embodiment shown in FIGS. 4A, 4B, and 4C, the main valve 64 is restricted from being rotationally moved in the circumferential direction centered on the axis O1 with respect to the valve rod 61.

Opening Operation of Stop Valve 45

The opening operation of the stop valve 45 in the steam valve 14 according to some embodiments will be described.

As shown in FIGS. 2, 3A, and 4A, in the steam valve 14 according to some embodiments, in a case where the stop valve 45 is closed, the outer peripheral portion of the abutting surface 71*b* of the main valve body 71 and the valve seat surface 48*a* of the valve seat 48 come into contact with each other, and the abutment portion 62B of the sub valve 62 and the sub valve seat 71*a* of the main valve body 71 come into contact with each other.

In the steam valve 14 according to another embodiment shown in FIGS. 4A, 4B, and 4C, in a case where the stop valve 45 is closed, a bottom surface 731 of the main valve body 71 and an abutting surface 81 of the support member 80 are separated from each other in the axial direction Z.

In a case where the valve rod 61 is driven toward the tip end side by the actuator 46B, the sub valve 62 fixed to the valve rod 61 moves toward the tip end side. Accordingly, high-pressure steam flows into the inlet 71B*a* of the through-hole 71B to be separated from the abutment portion 62B of the sub valve 62 and the sub valve seat 71*a* of the main valve body 71, and is guided to the steam flow path 52.

In the steam valve 14 according to another embodiment shown in FIGS. 4A, 4B, and 4C, in a case where the valve rod 61 is driven toward the tip end side by the actuator 46B, the support member 80 fixed to the valve rod 61 is moved toward the tip end side.

In the steam valve 14 according to the embodiment shown in FIGS. 3A and 3B, in a case where the valve rod 61 is further driven toward the tip end side, as shown in FIG. 3B, a surface 623*u* of the large-diameter portion 623 of the sub valve 62 on the tip end side abuts a facing surface 68 of an annular plate portion 67 of the guide portion 65 and presses the facing surface 68 toward the tip end side. Accordingly, the guide portion 65 and the main valve body 71 to which the guide portion 65 is fixed are driven toward the tip end side, and the outer peripheral portion of the abutting surface 71*b* of the main valve body 71 and the valve seat surface 48*a* of the valve seat 48 are separated from each other, whereby the main valve is opened.

In the steam valve 14 according to another embodiment shown in FIGS. 4A, 4B, and 4C, in a case where the valve rod 61 is further driven toward the tip end side, as shown in FIG. 4B, the abutting surface 81 of the support member 80 abuts the bottom surface 731 of the main valve body 71 and presses the main valve body 71 toward the tip end side. Accordingly, the main valve body 71 is driven toward the tip end side, and the outer peripheral portion of the abutting surface 71*b* of the main valve body 71 and the valve seat surface 48*a* of the valve seat 48 are separated from each other to open the main valve.

About Excitation and Abrasion of Main Valve 64

In a case where the steam valve 14 is opened and closed, the flow rate of steam is adjusted by adjusting the opening degree of the throttle valve 43 after the opening operation is performed in the order of the sub valve 62 and the main valve 64 in the stop valve 45 as described above.

Here, in a case where the throttle valve 43 in a closed state is opened from a state where the sub valve 62 and the main valve 64 are in the opened state, particularly in a case where the opening degree of the throttle valve 43 is small, the flow-in rate of the steam to the stop valve 45 is increased. In this case, the main valve 64 is excited by the inflowing steam, and there is a concern that abrasion may occur.

On the other hand, in the steam valve 14 according to some embodiments described above, the base end side of the main valve 64 is supported by the valve rod 61 to be slidable in the penetrating portion 71A, and in the tip end side of the main valve 64, the guide portion 65, that is movable together with the main valve 64, is supported on the tip end of the valve rod 61 through the sub valve 62. Accordingly, the distance in the axial direction Z between the position P1 at which the main valve 64 is supported on the base end side of the valve rod 61 and the position P2 at which the main valve 64 is supported on the tip end side of the valve rod 61 can be relatively large. Therefore, in a state where the stop valve 45 is opened, the movement of the swing of the main valve 64 to be inclined with respect to the axial direction Z can be easily suppressed. Therefore, it is possible to suppress the abrasion of the stop valve 45 in a state where the stop valve 45 is opened.

In the steam valve 14 according to some embodiments, the guide portion 65 guides the side surface 62C of the sub valve 62 to be slidable along the axial direction Z at a position on the tip end side of the valve rod 61 with respect to the sub valve seat 71*a*.

Accordingly, the position P2 at which the main valve 64 is supported on the tip end side of the valve rod 61 can be provided relatively on the tip end side of the valve rod 61. Accordingly, the distance in the axial direction Z between the position P1 at which the main valve 64 is supported on the base end side of the valve rod 61 and the position P2 at which the main valve 64 is supported on the tip end side of the valve rod 61 can be relatively large.

In the steam valve 14 according to the embodiment shown in FIGS. 3A and 3B, the guide portion 65 is configured to guide the side surface of the small-diameter portion 625 to be slidable along the axial direction Z.

Accordingly, the position P2 at which the main valve 64 is supported on the tip end side of the valve rod 61 can be provided relatively on the tip end side of the valve rod 61. Accordingly, the distance in the axial direction Z between the position P1 at which the main valve 64 is supported on the base end side of the valve rod 61 and the position P2 at which the main valve 64 is supported on the tip end side of the valve rod 61 can be relatively large.

In the steam valve 14 according to the embodiment shown in FIGS. 3A and 3B, the facing surface 68 is configured to abut the large-diameter portion 623 in a case where the sub valve 62 is opened.

Accordingly, the large-diameter portion 623 abuts the facing surface 68 to press the facing surface 68, and the guide portion 65 and the main valve 64 (main valve body 71) are moved toward the tip end side, whereby the main valve 64 can be opened. Accordingly, the valve opening mechanism of the main valve 64 can be realized by a relatively simple structure.

In the steam valve 14 according to some embodiments, the penetrating portion 71A may have a build-up portion 713*a* built up with a material different from the material of the penetrating portion 71A (that is, the main valve body 71) and the valve rod 61, in the contact portion 713 between the penetrating portion 71A and the valve rod 61.

In the steam valve 14 according to some embodiments, the guide portion 65 may have a build-up portion 67*a* or a build-up portion 66*a* built up with a material different from the material of the guide portion 65 and the sub valve 62, on the inner peripheral surface 67*i* of the through-hole 67*h* which is the contact portion between the guide portion 65 and sub valve 62, or the inner peripheral surface 66*i* of the tubular portion 66.

Accordingly, it is possible to suppress the abrasion of the contact portion 713 and the abrasion of the inner peripheral surface 67*i* or the inner peripheral surface 66*i*.

In the steam valve 14 according to another embodiment shown in FIGS. 4A, 4B, and 4C, the support member 80 is configured such that the abutting surface 81 abuts the bottom surface 731 of the main valve 64 in a case where the main valve 64 is opened, to support the main valve 64.

Accordingly, since the area of the abutting surface 81 can be relatively increased easily, it is easy to suppress the surface pressure in a case where the abutting surface 81 abuts the bottom surface 731 of the main valve 64, and it is easy to suppress the abrasion of the abutting surface 81 and the bottom surface 731 of the main valve 64 which the abutting surface 81 abuts.

In the steam valve 14 according to another embodiment shown in FIGS. 4A, 4B, and 4C, the abutment region R of the abutting surface 81 and the bottom surface 731 of the main valve 64 may include a region on the outer side in the radial direction than the position on the outermost side in the radial direction centered on the axis O1 in the sub valve 62.

Accordingly, since the area of the abutting surface 81 is relatively large, the surface pressure in a case where the abutting surface 81 abuts the bottom surface 731 of the main valve 64 can be suppressed, and it is possible to suppress the abrasion of the abutting surface 81 and the bottom surface 731 of the main valve 64, which the abutting surface 81 abuts.

In the steam valve 14 according to another embodiment shown in FIGS. 4A, 4B, and 4C, the abutting surface 81 is an inclined surface that is inclined toward the base end side as going toward the inner side in the radial direction.

Accordingly, the area of the abutting surface 81 can be easily increased as compared with a case where the abutting surface 81 is a flat surface that is not the inclined surface, and the surface pressure in a case where the abutting surface 81 abuts the bottom surface 731 of the main valve 64 can be easily suppressed. Therefore, it is easy to suppress the abrasion of the abutting surface 81 and the bottom surface 731 of the main valve 64 which the abutting surface 81 abuts.

In addition, the abrasion powder generated by the contact between the abutting surface 81 and the bottom surface 731 of the main valve 64 is easily guided to the recessed portion 81D provided on the inner side in the radial direction, and thus the abrasion powder is easily discharged through the plurality of abrasion powder discharge holes 81C.

In the steam valve 14 according to another embodiment shown in FIGS. 4A, 4B, and 4C, the support member 80 may have a build-up portion 85*b* built up with a material different from the material of the main valve 64 and support member 80, on the outer peripheral portion 85 which is the contact portion between the main valve 64 and the support member 80.

Accordingly, it is possible to suppress the abrasion on the outer peripheral portion 85.

In the steam valve 14 according to another embodiment shown in FIGS. 4A, 4B, and 4C, a linear outer peripheral portion 85*a* is formed on the outer peripheral portion 85 of the support member 80, and a linear inner peripheral portion 733*a* is formed on the peripheral wall portion 733 of the main valve 64.

Accordingly, since the linear outer peripheral portion 85*a* and the linear inner peripheral portion 733*a* face each other, it is possible to prevent rotation of the support member 80 fixed to the main valve 64 and valve rod 61 about the axis O1, that is, rotation of the main valve 64 about the axis O1 with respect to the valve rod 61.

The steam valve 14 according to some embodiments has the throttle valve 43 that is disposed to face the stop valve 45 in the axial direction Z and can abut the valve seat 48 at a position on the outer side in the radial direction with respect to the position of the valve seat 48 where the main valve 64 abuts.

As a result, since the power generation system 1 includes the steam valve 14 capable of suppressing the abrasion of the stop valve 45, it is possible to reduce the maintenance frequency of the steam valve 14, and thus it is possible to improve the operation efficiency of the power generation system 1.

A power generation system 1 according to some embodiments includes a steam valve 14 according to some embodiments, a boiler 11 that generates steam, a steam turbine 10 that is driven by the steam, and a steam supply pipe (first steam supply pipe 12) that connects the boiler 11 and the steam turbine 10 and supplies the steam to the steam turbine 10. The steam valve 14 is provided in the steam supply pipe (first steam supply pipe 12).

As a result, since the power generation system 1 includes the steam valve 14 capable of suppressing the abrasion of the stop valve 45, it is possible to reduce the maintenance frequency of the steam valve 14, and thus it is possible to improve the operation efficiency of the power generation system 1.

The present disclosure is not limited to the above-described embodiments, and also includes a form in which modifications are added to the above-described embodiments or a form in which the embodiments are combined with each other as appropriate.

For example, contents described in each of the above-described embodiments are understood as follows.

(1) The steam valve 14 according to at least one embodiment of the present disclosure includes a valve body 41 that has a flow path partition portion 47 that partitions a steam flow path 52 through which steam flows, and a valve seat 48 that is provided in a middle of the steam flow path 52 and has an opening portion. The steam valve according to at least one embodiment of the present disclosure includes a stop valve 45. The stop valve 45 has a valve rod 61 that extends in an axial direction Z along which an axis O1 extends and is configured to advance and retract in the axial direction Z. The stop valve 45 has a sub valve 62 that is fixed to a tip end of the valve rod 61 of a tip end portion of the valve rod 61. The stop valve 45 has a main valve 64 that includes a penetrating portion 71A into which a portion of the tip end portion 61A of the valve rod 61 positioned on a base end side of the valve rod 61 with respect to the tip end is inserted, that closes the steam flow path 52 by abutting the valve seat 48, and into which a through-hole 71B through which steam flows in a case where the sub valve 62 is opened is formed. The stop valve 45 has a guide portion 65 that is movable in the axial direction Z together with the main valve 64 and guides a side surface 62C of the sub valve 62 to be slidable along the axial direction Z.

According to the configuration of (1) described above, the base end side of the main valve 64 is supported by the valve rod 61 to be slidable in the penetrating portion 71A, and in the tip end side of the main valve 64, the guide portion 65, that is movable together with the main valve 64, is supported on the tip end of the valve rod through the sub valve 62. Accordingly, the distance in the axial direction Z between the position P1 at which the main valve is supported on the base end side of the valve rod and the position P2 at which the main valve is supported on the tip end side of the valve rod 61 can be relatively large. Therefore, in a state where the stop valve 45 is opened, the movement of the swing of the main valve 64 to be inclined with respect to the axial direction Z can be easily suppressed. Therefore, it is possible to suppress the abrasion of the stop valve 45 in a state where the stop valve 45 is opened.

(2) In some embodiments, in the configuration of (1), the main valve 64 may have a sub valve seat 71*a* which the sub valve 62 is capable of abutting. The guide portion 65 may guide the side surface 62C of the sub valve 62 to be slidable along the axial direction Z at a position on a tip end side of the valve rod 61 with respect to the sub valve seat 71*a*.

With the above configuration (2), the position P2 at which the main valve 64 is supported on the tip end side of the valve rod 61 can be provided relatively on the tip end side of the valve rod 61. Accordingly, the distance in the axial direction Z between the position P1 at which the main valve 64 is supported on the base end side of the valve rod 61 and the position P2 at which the main valve 64 is supported on the tip end side of the valve rod 61 can be relatively large.

(3) In some embodiments, in the configuration of (2), the sub valve 62 may have a large-diameter portion 623 and a small-diameter portion 625 that has a diameter smaller than a diameter of the large-diameter portion 623, and is positioned on the tip end side with respect to the large-diameter portion 623. The guide portion 65 may be configured to guide a side surface of the small-diameter portion 625 to be slidable along the axial direction Z.

With the above configuration (3), the position P2 at which the main valve 64 is supported on the tip end side of the valve rod 61 can be provided relatively on the tip end side of the valve rod 61. Accordingly, the distance in the axial direction Z between the position P1 at which the main valve 64 is supported on the base end side of the valve rod 61 and the position P2 at which the main valve 64 is supported on the tip end side of the valve rod 61 can be relatively large.

(4) In some embodiments, in the configuration of (3), the guide portion 65 may have a facing surface 68 that faces toward the base end side and opposes the large-diameter portion 623. The facing surface 68 may be configured to abut the large-diameter portion 623 in a case where the sub valve 62 is opened.

According to the configuration of (4) described above, since the large-diameter portion 623 abuts the facing surface 68 and presses the facing surface 68 to move the guide portion 65 and the main valve 64 toward the tip end side, the main valve 64 can be opened. Accordingly, the valve opening mechanism of the main valve 64 can be realized by a relatively simple structure.

(5) In some embodiments, in the configuration of any one of (1) to (4), any one of the penetrating portion 71A or the valve rod 61 may have a build-up portion (build-up portion 713*a*) built up with a material different from a material of the penetrating portion 71A and the valve rod 61 at a contact portion (contact portion 713) between the penetrating portion 71A and the valve rod 61. Any one of the guide portion 65 or the sub valve 62 may have a build-up portion (build-up portion 67*a* or build-up portion 66*a*) built up with a material different from a material of the guide portion 65 and the sub valve 62 at a contact portion (inner peripheral surface 67*i* of through-hole 67*h* or inner peripheral surface 66*i* of tubular portion 66) between the guide portion 65 and the sub valve 62.

According to the configuration of (5), it is possible to suppress the abrasion of the contact portion (contact portion 713) between the penetrating portion 71A and the valve rod 61 and the abrasion of the contact portion (inner peripheral surface 67*i* of the through-hole 67*h* or the inner peripheral surface 66*i* of the tubular portion 66) between the guide portion 65 and the sub valve 62.

(6) In some embodiments, in the configuration of any one of (1) to (5), a support member 80 that is positioned closer to the base end side than the main valve 64, is fixed to the valve rod 61, and has an abutting surface 81 capable of abutting a bottom surface 731 that faces toward the base end side of the main valve 64 may be provided. The support member 80 may be configured to support the main valve 64 by having the abutting surface 81 abutting the bottom surface 731 of the main valve 64 in a case where the main valve 64 is opened.

According to the configuration of (6), the area of the abutting surface 81 can be relatively increased easily. Therefore, it is easy to suppress the surface pressure in a case where the abutting surface 81 abuts the bottom surface 731 of the main valve 64, and it is easy to suppress the abrasion of the abutting surface 81 and the bottom surface 731 of the main valve 64, which the abutting surface 81 abuts.

(7) In some embodiments, in the configuration of (6), an abutment region R the bottom surface 731 with the abutting surface 81 may include a region on an outer side in a radial direction than a position on an outermost side in the radial direction centered on the axis O1 of the sub valve 62.

According to the configuration of (7), the area of the above-described abutting surface 81 is relatively large. Therefore, it is possible to suppress the surface pressure in a case where the abutting surface 81 abuts the bottom surface 731 of the main valve 64, and it is possible to suppress the abrasion of the abutting surface 81 and the bottom surface 731 of the main valve 64, which the abutting surface 81 abuts.

(8) In some embodiments, in the configuration of (6) or (7), the abutting surface 81 may be an inclined surface that is inclined toward the base end side as going toward an inner side in a radial direction centered on the axis O1.

According to the configuration of the (8), since the area of the abutting surface 81 is easily increased by making the abutting surface 81 the inclined surface, the surface pressure in a case where the abutting surface 81 abuts the bottom surface 731 of the main valve 64 is easily suppressed, and the abrasion of the abutting surface 81 and the bottom surface 731 of the main valve 64, which the abutting surface 81 abuts is easily suppressed.

(9) In some embodiments, in the configuration of any one of (6) to (8), any one of the main valve 64 or the support member 80 may have a build-up portion (build-up portion 85*b*) built up with a material different from a material of the main valve 64 and the support member 80 at a contact portion (outer peripheral portion 85) between the main valve 64 and the support member 80.

According to the configuration of the (9), it is possible to suppress the abrasion in the contact portion (outer peripheral portion 85) between the main valve 64 and the support member 80.

(10) In some embodiments, in the configuration of any one of (6) to (9), the main valve 64 may have an inner peripheral portion (peripheral wall portion 733) that is configured to be slidable along the axial direction Z in an outer peripheral portion 85 of the support member 80. The support member 80 may have a linear outer peripheral portion 85*a* that is formed in a linear shape as viewed along the axis O1 in at least a part of the outer peripheral portion 85. The main valve 64 may have a linear inner peripheral portion 733*a* that is formed in a linear shape as viewed along the axis O1 in the inner peripheral portion (peripheral wall portion 733) and faces the linear outer peripheral portion 85*a*.

According to the configuration of (10), since the linear outer peripheral portion 85*a* and the linear inner peripheral portion 733*a* face each other, it is possible to prevent rotation of the support member 80 fixed to the main valve 64 and valve rod 61 about the axis, that is, rotation of the main valve 64 about the axis O1 with respect to the valve rod 61.

(11) In some embodiments, in the configuration of any one of (1) to (10), a throttle valve 43 that is disposed to face the stop valve 45 and is configured to abut the valve seat 48 at a position on an outer side in a radial direction centered on the axis O1 than a position of the valve seat 48 at which the main valve 64 abuts, in the axial direction Z, may be provided.

According to the configuration of the above (11), since the power generation system 1 includes the steam valve 14 capable of suppressing the abrasion of the stop valve 45, it is possible to reduce the maintenance frequency of the steam valve 14, and thus it is possible to improve the operation efficiency of the power generation system 1.

(12) The power generation system 1 according to at least one embodiment of the present disclosure includes the steam valve 14 having the configuration of any one of (1) to (11), a boiler 11 that generates steam; a steam turbine 10 that is driven by the steam, and a steam supply pipe (first steam supply pipe 12) that connects the boiler 11 and the steam turbine 10 to each other and supplies the steam to the steam turbine 10. The steam valve 14 is provided in the steam supply pipe (first steam supply pipe 12).

According to the configuration of the above (12), since the power generation system 1 includes the steam valve 14 capable of suppressing the abrasion of the stop valve 45, it is possible to reduce the maintenance frequency of the steam valve 14, and thus it is possible to improve the operation efficiency of the power generation system 1.

REFERENCE SIGNS LIST

1: power generation system
10: steam turbine
11: boiler
12: first steam supply pipe
14: steam valve
41: valve body
43: throttle valve
45: stop valve
47: flow path partition portion
48: valve seat
61: valve rod
62: sub valve
64: main valve
65: guide portion
68: facing surface
71: main valve body
71A: penetrating portion
71B: through-hole
80: support member
81: abutting surface
623: large-diameter portion
625: small-diameter portion
713: contact portion
731: bottom surface

The invention claimed is:

1. A steam valve comprising:

a valve body that has a flow path partition portion that partitions a steam flow path through which steam flows, and a valve seat that is provided in a middle of the steam flow path and has an opening portion; and a stop valve, wherein the stop valve includes a valve rod that extends in an axial direction along which an axis extends and is configured to advance and retract in the axial direction, a sub valve that is fixed to a tip end of the valve rod of a tip end portion of the valve rod, a main valve that includes a penetrating portion into which a portion of the tip end portion of the valve rod positioned on a base end side of the valve rod with respect to the tip end is inserted, that closes the steam flow path by abutting the valve seat, and in which a through-hole through which steam flows in a case where the sub valve is opened is formed, and a guide portion that is movable in the axial direction together with the main valve and guides a side surface of the sub valve to be slidable along the axial direction, wherein the sub valve has a large-diameter portion and a small-diameter portion that has a diameter smaller than a diameter of the large-diameter portion and is positioned on the tip end side with respect to the large-diameter portion, wherein the large-diameter portion has a surface perpendicular to the axis on the tip end side, wherein the guide portion has a facing surface that faces toward the base end side and opposes the surface of the large-diameter portion, the facing surface being perpendicular to the axis, and wherein the facing surface abuts the surface of the large-diameter portion in a case where the sub valve is opened.

2. The steam valve according to claim 1, wherein
the main valve has a sub valve seat which the sub valve is capable of abutting, and
the guide portion guides the side surface of the sub valve to be slidable along the axial direction at a position on a tip end side of the valve rod with respect to the sub valve seat.

3. The steam valve according to claim 2, wherein
the sub valve has a large-diameter portion and a small-diameter portion that has a diameter smaller than a diameter of the large-diameter portion, and is positioned on the tip end side with respect to the large-diameter portion, and
the guide portion guides a side surface of the small-diameter portion to be slidable along the axial direction.

4. The steam valve according to claim 3, wherein
the guide portion has a facing surface that faces toward the base end side and opposes the large-diameter portion, and
the facing surface abuts the large-diameter portion in a case where the sub valve is opened.

5. The steam valve according to claim 1, wherein
any one of the penetrating portion or the valve rod has a build-up portion built up with a material different from a material of the penetrating portion and the valve rod at a contact portion between the penetrating portion and the valve rod, and
any one of the guide portion or the sub valve has a build-up portion built up with a material different from a material of the guide portion and the sub valve at a contact portion between the guide portion and the sub valve.

6. The steam valve according to claim 1, further comprising:
a throttle valve that is disposed to face the stop valve and is configured to abut the valve seat at a position on an outer side in a radial direction centered on the axis than a position of the valve seat at which the main valve abuts, in the axial direction.

7. A power generation system comprising:
the steam valve according to claim 1;
a boiler that generates steam;
a steam turbine that is driven by the steam; and
a steam supply pipe that connects the boiler and the steam turbine to each other and supplies the steam to the steam turbine, wherein
the steam valve is provided in the steam supply pipe.

8. A steam valve comprising:
a valve body that has a flow path partition portion that partitions a steam flow path through which steam flows, and a valve seat that is provided in a middle of the steam flow path and has an opening portion; and
a stop valve,
wherein the stop valve includes
a valve rod that extends in an axial direction along which an axis extends and is configured to advance and retract in the axial direction,
a sub valve that is fixed to a tip end of the valve rod of a tip end portion of the valve rod,
a main valve that includes a penetrating portion into which a portion of the tip end portion of the valve rod positioned on a base end side of the valve rod with respect to the tip end is inserted, that closes the steam flow path by abutting the valve seat, and in which a through-hole through which steam flows in a case where the sub valve is opened is formed, and
a guide portion that is movable in the axial direction together with the main valve and guides a side surface of the sub valve to be slidable along the axial direction,
wherein the steam valve further comprises
a support member that is positioned closer to the base end side than the main valve, is fixed to the valve rod, and has an abutting surface capable of abutting a bottom surface that faces toward the base end side of the main valve, wherein
the support member supports the main valve by having the abutting surface abutting the bottom surface of the main valve in a case where the main valve is opened.

9. The steam valve according to claim 8, wherein
an abutment region of the abutting surface with the bottom surface includes a region on an outer side in a radial direction than a position on an outermost side in the radial direction centered on the axis of the sub valve.

10. The steam valve according to claim 8, wherein
the abutting surface is an inclined surface that is inclined toward the base end side as going toward an inner side in a radial direction centered on the axis.

11. The steam valve according to claim 8, wherein
any one of the main valve or the support member has a build-up portion built up with a material different from a material of the main valve and the support member at a contact portion between the main valve and the support member.

12. The steam valve according to claim 8, wherein
the main valve has an inner peripheral portion that is configured to be slidable along the axial direction in an outer peripheral portion of the support member,
the support member has a linear outer peripheral portion that is formed in a linear shape as viewed along the axis in at least a part of the outer peripheral portion, and
the main valve has a linear inner peripheral portion that is formed in a linear shape as viewed along the axis in the inner peripheral portion and faces the linear outer peripheral portion.

13. A steam valve comprising:
a valve body that has a flow path partition portion that partitions a steam flow path through which steam flows, and a valve seat that is provided in a middle of the steam flow path and has an opening portion; and
a stop valve,
wherein the stop valve includes
a valve rod that extends in an axial direction along which an axis extends and is configured to advance and retract in the axial direction,
a sub valve that is fixed to a tip end of the valve rod of a tip end portion of the valve rod,
a main valve that includes a penetrating portion into which a portion of the tip end portion of the valve rod positioned on a base end side of the valve rod with respect to the tip end is inserted, that closes the steam flow path by abutting the valve seat, and in which a through-hole through which steam flows in a case where the sub valve is opened is formed, and
a guide portion that is movable in the axial direction together with the main valve and guides a side surface of the sub valve to be slidable along the axial direction,
wherein the main valve has a main valve body,
wherein a build-up portion configured to abut the valve seat is provided on one surface of the main valve body, wherein a tubular portion of the guide portion that surrounds the side surface of the sub valve in a circumferential direction is provided on the other surface of the main valve body, and wherein the tubular portion is positioned radially inward of the build-up portion.

14. The steam valve according to claim 13, wherein the guide portion has a shape comprising the tubular portion and an annular plate portion, wherein the tubular portion surrounds a large-diameter portion of the sub valve, wherein the sub valve has a small-diameter portion that has a diameter smaller than a diameter of the large-diameter portion and is positioned on the tip end side with respect to the large-diameter portion, and wherein the small-diameter portion is inserted into a through-hole provided in the annular plate portion.

* * * * *